(12) United States Patent
Monaghan (10) Patent No.: US 11,688,087 B1
(45) Date of Patent: Jun. 27, 2023

(54) SYSTEMS AND METHODS FOR USING HYPERSPECTRAL DATA TO PRODUCE A UNIFIED THREE-DIMENSIONAL SCAN THAT INCORPORATES DEPTH

(71) Applicant: Illuscio, Inc., Culver City, CA (US)

(72) Inventor: Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/822,577

(22) Filed: Aug. 26, 2022

(51) Int. Cl.
| | |
|---|---|
| *G06T 7/521* | (2017.01) |
| *G06V 10/764* | (2022.01) |
| *G06V 10/143* | (2022.01) |
| *G06T 15/08* | (2011.01) |
| *G01S 17/89* | (2020.01) |
| *G06V 10/75* | (2022.01) |

(52) U.S. Cl.
CPC .............. *G06T 7/521* (2017.01); *G01S 17/89* (2013.01); *G06T 15/08* (2013.01); *G06V 10/143* (2022.01); *G06V 10/757* (2022.01); *G06V 10/764* (2022.01); *G06T 2207/10028* (2013.01); *G06T 2207/10036* (2013.01); *G06T 2207/10048* (2013.01); *G06T 2207/10064* (2013.01)

(58) Field of Classification Search
CPC ..................... G06T 7/521; G06T 15/08; G06T 2207/10028; G06T 2207/10036; G06T 2207/10048; G06T 2207/10064; G06V 10/143; G06V 10/757; G06V 10/764; G01S 17/89

USPC .......................................................... 345/419
See application file for complete search history.

(56) References Cited

U.S. PATENT DOCUMENTS

| | | | | |
|---|---|---|---|---|
| 2006/0017720 | A1* | 1/2006 | Li ...................... | G01B 11/2504 345/419 |
| 2009/0326383 | A1* | 12/2009 | Barnes .................... | A61B 5/442 850/1 |
| 2014/0085622 | A1* | 3/2014 | Wong ..................... | G01J 3/2823 356/5.04 |
| 2019/0096049 | A1* | 3/2019 | Kim ......................... | G06N 3/08 |

* cited by examiner

*Primary Examiner* — Hai Tao Sun
(74) *Attorney, Agent, or Firm* — Ansari Katiraei LLP; Arman Katiraei; Sadiq Ansari (57) ABSTRACT

An encoder is disclosed that uses hyperspectral data to produce a unified three-dimensional ("3D") scan that incorporates depth for various points, surfaces, and features within a scene. The encoder may scan a particular point of the scene using frequencies from different electromagnetic spectrum bands, may determine spectral properties of the particular point based on returns measured across a first set of bands, may measure a distance of the particular point using frequencies of another band that does not interfere with the spectral properties at each of the first set of bands, and may encode the spectral properties and the distance of the particular point in a single hyperspectral dataset. The spectral signature encoded within the dataset may be used to classify the particular point or generate a point cloud or other visualization that accurately represents the spectral properties and distances of the scanned points.

20 Claims, 8 Drawing Sheets

SYSTEMS AND METHODS FOR USING HYPERSPECTRAL DATA TO PRODUCE A UNIFIED THREE-DIMENSIONAL SCAN THAT INCORPORATES DEPTH

BACKGROUND

Photogrammetry is a process for producing three-dimensional ("3D") imagery. Photogrammetry may involve performing a first scan to capture the color attributes and/or other spectral properties of an object, scene, or environment, and performing a subsequent second scan to obtain the depth of various points, surfaces, or features of the object or that are within the scanned scene or environment. Photogrammetry may further involve aligning the data from the first and second scans so that the data may be combined in order to generate a 3D image or model of the object, scene, or environment in which the color attributes and/or other spectral properties are presented at correct depths or positions about the object, scene, or environment.

Various inaccuracies may be introduced when using and/or positioning two different devices to capture the spectral properties separate from the depth data, and when aligning the separate scans in order to combine the spectral properties with the depth data. The inaccuracies may include associating the wrong spectral properties to the wrong points, surfaces, or features at incorrect depth or positions in the generated 3D image or model.

DETAILED DESCRIPTION OF PREFERRED EMBODIMENTS

The following detailed description refers to the accompanying drawings. The same reference numbers in different drawings may identify the same or similar elements.

Provided are systems and methods for using hyperspectral data to produce a unified three-dimensional ("3D") scan that incorporates depth. The systems and methods may include performing a single scan of a scene in order to simultaneously capture the spectral properties (e.g., color attributes) and the depth information from that single scan using a single device or set of sensors. The systems and methods may further include encoding the spectral properties and the depth information in a single hyperspectral dataset so that the spectral properties are directly aligned and associated with the depth information at which those spectral properties were measured.

The single hyperspectral dataset may contain all the data that is needed to create a volumetric image or 3D representation of the scanned scene. In other words, the volumetric image may be rendered and/or constructed without having to combine disparate scans or datasets, thereby avoiding the need to later align depth information with color data.

The systems and methods may provide a hyperspectral encoder for capturing and/or encoding the depth information and the color data to different bands of the hyperspectral dataset such that the depth information is directly aligned with the color data for different points, surfaces, or features that are captured from the scanned scene at the same time using the same device and/or sensors. Accordingly, the volumetric image and/or 3D representation that is generated from the single hyperspectral dataset may more accurately represent the scanned scene than when generating the volumetric image and/or 3D representation from aligning and combining a first scan containing spectral properties of the scene with a second scan containing depth information for the different points, surfaces, and/or features detected within the scene.

Figure 1:
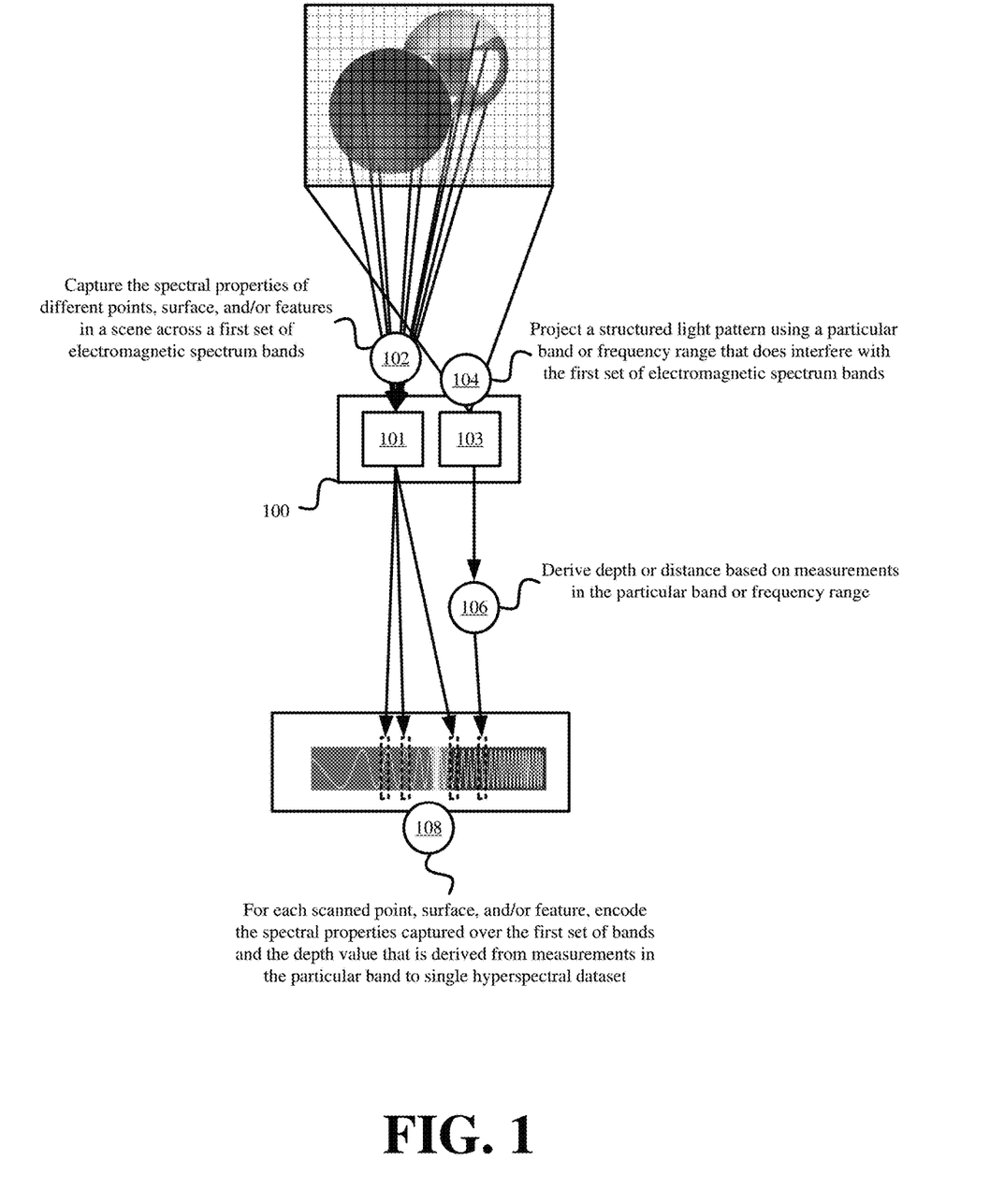
FIG. 1 illustrates an example of simultaneously scanning and encoding spectral properties and depth information in a single hyperspectral dataset in accordance with some embodiments presented herein.

FIG. 1 illustrates an example of simultaneously scanning and encoding spectral properties and depth information in a single hyperspectral dataset in accordance with some embodiments presented herein. FIG. 1 may include using hyperspectral encoder 100 to perform the simultaneous spectral and depth scanning and encoding. Hyperspectral encoder 100 may include hyperspectral imaging sensor 101 and depth detector 103.

Hyperspectral imaging sensor 101 may capture (at 102) the spectral properties of different points, surface, and/or features in a scene over a first set of frequencies or bands of the electromagnetic spectrum based on reflectance, intensity, and/or other measurements taken for each point, surface, and/or feature at the different measured frequencies or bands. For instance, hyperspectral imaging sensor 101 may include one or more sensors for capturing the red, green, and blue ("RGB") bands of the visible light spectrum as well as various bands within the infrared, ultraviolet, and/or other frequency ranges of the electromagnetic spectrum.

Depth detector 103 may be configured to project (at 104) a structured light pattern using a particular band or frequency range of the electromagnetic spectrum that does not interfere with, is not destructive, and does not impact the capture (at 102) of the hyperspectral properties in the first set of bands. In some embodiments, hyperspectral imaging sensor 101 may obtain measurements at the particular band or frequency range for each point, surface, and/or feature that is also scanned using the first set of bands for the spectral properties. In some other embodiments, depth detector 103 may include one or more sensors for obtain measurements at the particular band or frequency range.

In any case, hyperspectral encoder 100 may derive (at 106) a depth or distance based on the obtained measurements from the particular band or frequency range for each scanned point, surface, and/or feature to include with the spectral properties measured for that same point, surface, and/or feature. For instance, hyperspectral encoder 100 may convert an amount of distortion to the projected structured light pattern to a depth or distance measure, or may perform time-of-flight or other measurements using frequencies within the particular band to derive the depth or distance measures.

In some embodiments, hyperspectral imaging sensor 101 and depth detector 103 may operate as a single unit (e.g., hyperspectral encoder 100) or may include one or more components of the same device (e.g., hyperspectral encoder 100). In any case, hyperspectral imaging sensor 101 and depth detector 103 may simultaneously scan multiple points, surfaces, and/or features from a scene of interest in order to obtain the spectral properties and distance for each scanned point, surface, and/or feature at the same time with the same device and/or sensors.

Hyperspectral encoder 100 may receive the outputs from hyperspectral imaging sensor 101 and depth detector 103 for each scanned point, surface, and/or feature of the scene, and may encode (at 108) the outputs to a single hyperspectral dataset that is created for each scanned point, surface, and/or feature. Specifically, hyperspectral encoder 100 may generate a file that includes, for each scanned point, surface, and/or feature of the scene, the measurements that are captured for each band of the first set of bands and that correspond to the spectral properties of interest for a particular point, surface, and/or feature, and also the depth or distance values for the particular point, surface, and/or feature that are derived from the particular band measurements. In other words, the measurements obtained for the particular band may be used to derive the different depths and/or positions at which the spectral properties for the same points, surfaces, or features within the scene are captured. Specifically, for each point, surface, or feature that is scanned, hyperspectral encoder 100 may encode the file with the spectral properties captured for that point, surface, or feature across the first set bands and also the depth measurement captured for that point, surface, or feature using the frequencies within the particular band.

Figure 2:
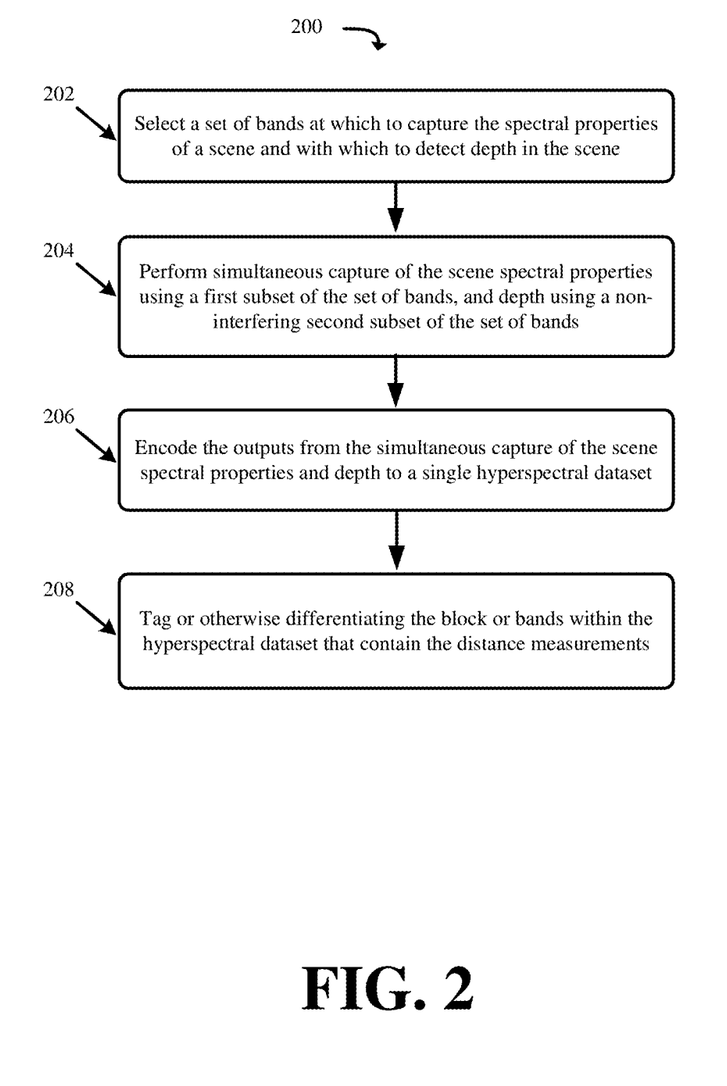
FIG. 2 presents a process for scanning and encoding spectral properties and depth information in a single hyperspectral dataset in accordance with some embodiments presented herein.

FIG. 2 presents a process 200 for scanning and encoding spectral properties and depth information in a single hyperspectral dataset in accordance with some embodiments presented herein. Process 200 may be implemented by hyperspectral encoder 100.

Process 200 may include selecting (at 202) a set of bands at which to capture the spectral properties of a scene and with which to detect depth in the scene. In some embodiments, the selection (at 202) of the set of bands may be predetermined or fixed by the bands that hyperspectral imaging sensor 101 is able to capture. In some such embodiments, the same subset of bands may be used for the spectral property capture and the same particular band may be used for the depth measurements. For instance, various fluorescent light frequencies may be used to obtain very fine and accurate depth measurements without interfering with or impacting visible light, infrared, ultraviolet, and/or other frequencies or bands of the electromagnetic spectrum. Alternatively, one band from the set of bands may be interchangeably selected for the depth measurements, and the other bands from the set of bands may be used for the spectral property capture. In some other embodiments, the selection (at 202) may be based on the scene lighting or may be specified based on user preferences. For instance, the selection (at 202) may exclude the visible light spectrum and may include more bands within the infrared spectrum for a dark scene, and may include the visible light spectrum and one or more ultraviolet spectrum bands for a well-lit scene.

Process 200 may include performing (at 204) a simultaneous capture of the scene spectral properties using a first subset of the set of bands, and depth using a non-interfering second subset of the set of bands. In some embodiments, the second subset of bands may be a narrow single band that is at a different end of the electromagnetic spectrum than the first subset of bands or that specify a frequency that is separated from frequencies of the first subset of bands by a specified amount.

In some embodiments, performing (at 204) the simultaneous capture may include focusing hyperspectral imaging sensor 101 and depth detector 103 on the same one or more points, surfaces, and/or features of the scene, measuring the spectral properties and distances of those one or more points, surfaces, and/or features over the first subset of bands and the second subset of bands, moving or refocusing on a different set of one or more points, surfaces, and/or features of the scene, and repeating until the scene is fully scanned (e.g., all points, surfaces, and/or features within the scene or a designated region of the scene are scanned).

In some embodiments, performing (at 204) the simultaneous capture may include projecting a structured light pattern using frequencies of the second subset of bands, and converting minor distortions or variations in the structured light pattern, that are sensed by hyperspectral imaging sensor 101 and depth detector 103, to depth measurements that may then get recorded in the second subset of bands of the single hyperspectral dataset. In some embodiments, performing (at 204) the simultaneous capture may include performing time-of-flight measurements using the frequencies of the second subset of bands, and converting the time-of-flight measurements into depth measurements that are then recorded in the second subset of bands of the single hyperspectral dataset. Other techniques may be used to measure the distance or position of various points, surfaces, and/or features of the scene using the frequencies within the second subset of bands, and to record the distance measurements as values within the second subset of bands of the single hyperspectral dataset.

In some embodiments, performing (at 204) the simultaneous capture may also include measuring the reflectance of the various points, surfaces, and/or features of the scene at each band of the first subset of bands. For instance, the first subset of bands may include the RGB bands, a first infrared band, and a first ultraviolet band. Hyperspectral imaging sensor 101 may focus on a specific point, and may measure the reflectance produced by that point for each of the RGB bands, the first infrared band, and the first ultraviolet band. Points with different visual characteristics and/or material properties may have different spectral properties that may be captured by hyperspectral imaging sensor 101.

Process 200 may include encoding (at 206) the outputs from the simultaneous capture of the scene spectral properties and depth to a single hyperspectral dataset. The single hyperspectral dataset may include an array for each scanned point, surface, and/or feature of the scene. Each array may include a set of values for the scanned point, surface, and/or feature associated with that array. The one or more values recorded for a band selected for spectral property measurement may represent the amount of reflectance measured by hyperspectral imaging sensor 101 for the corresponding point, surface, and/or feature at the frequencies within that band. The one or more values recorded for a particular band selected for depth or distance measurements may represent the distance of a point, surface, and/or feature as measured by depth detector 103 using the frequencies within that particular band.

Process 200 may include tagging (at 208) or otherwise differentiating the block or bands within the hyperspectral dataset that contain the distance measurements. The tagging (at 208) may identify where the distance measurements are stored within the hyperspectral dataset so that hyperspectral encoder 100 may adapt the file format to encode different bands of the electromagnetic spectrum and to shift the distance measurements to different bands within the hyperspectral dataset. For instance, hyperspectral encoder 100 may capture the spectral properties from a first set of bands and the distance measurements using frequencies from a first fluorescent light band, and may encode the captured spectral properties and distance measurements to corresponding bands represented by a first hyperspectral dataset. Hyperspectral encoder 100 may also capture the spectral properties from a second set of bands and the distance measurements using frequencies from a second fluorescent light band, and may encode those values to corresponding bands represented by a second hyperspectral dataset.

In some embodiments, process 200 may include repositioning hyperspectral imaging sensor 101 and/or depth detector 103, and reperforming process 200 in order to scan and encode desired regions, points, surfaces, and/or features of a scene. Process 200 may terminate once the scene or desired parts of the scene have been scanned and encoded to the hyperspectral datasets.

Figure 3:
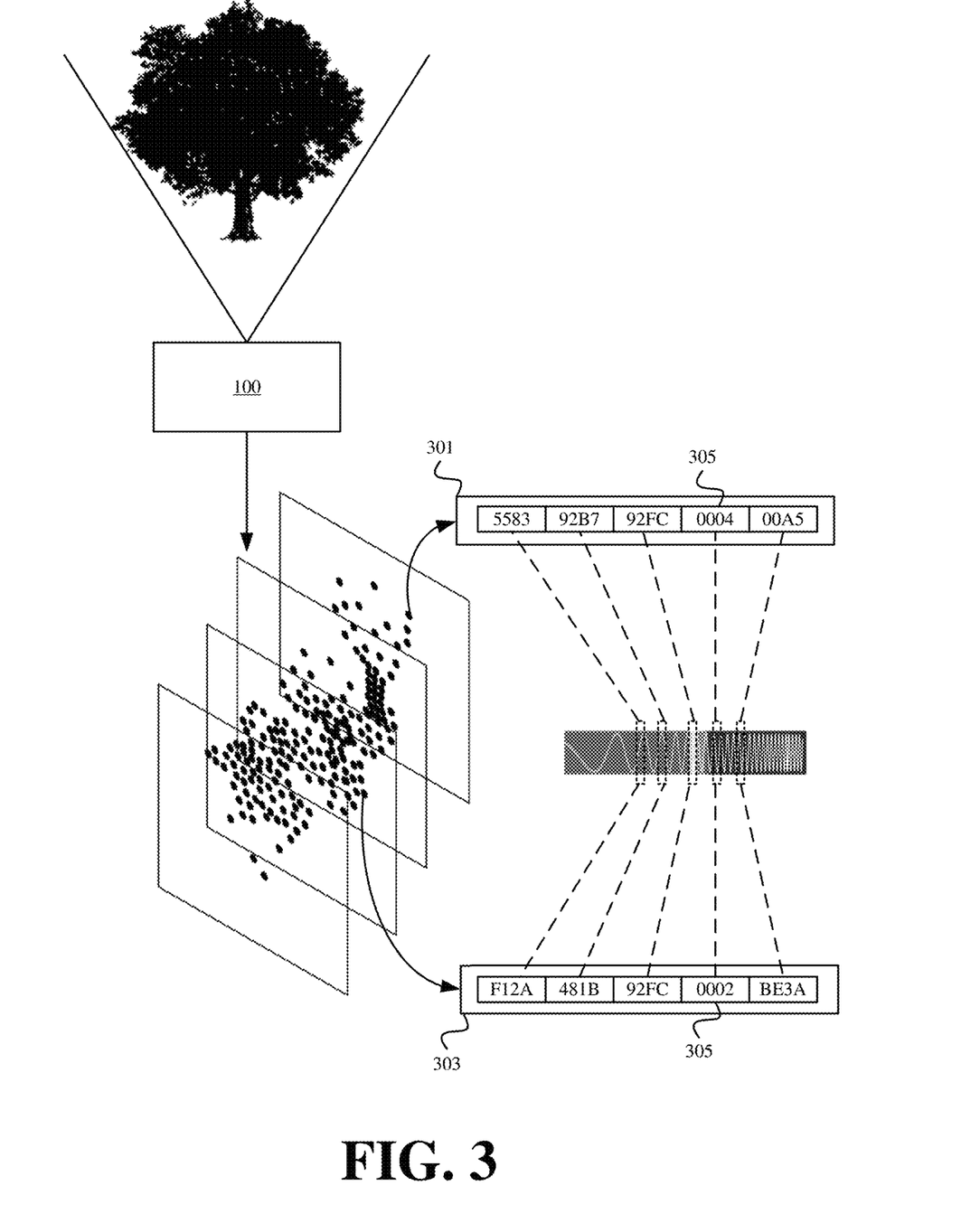
FIG. 3 illustrates an example of a hyperspectral dataset that is encoded with spectral properties in a first set of bands and with distance measurements for the same points, surfaces, or features in at least one other band in accordance with some embodiments presented herein.

FIG. 3 illustrates an example of a hyperspectral dataset that is encoded with spectral properties in a first set of bands and with distance measurements for the same points, surfaces, or features in at least one other band in accordance with some embodiments presented herein. Each scanned point within a scene may be defined with a hyperspectral dataset. For instance, as shown in FIG. 3, a first data point may be defined with first hyperspectral dataset 301 and a second data point may be defined with second hyperspectral dataset 303.

Each hyperspectral dataset 301 and 303 for each scanned point may be defined as a set of blocks that may be of equal size or different sizes. Each block may encode the measurements obtained for a different selected band of the electromagnetic spectrum as a set of hexadecimal or other set of values. For instance, the block corresponding to the red band within the visible light spectrum may include values for the reflectance and/or intensity of light measured at the frequencies of the red band. In some embodiments, at least one of the blocks 305 may be used to store a distance measurement rather than a reflectance and/or intensity measurement for a spectral property. In some such embodiments, block 305 may span a similar value range as the blocks used to encode the spectral properties. However, the values within block 305 may be decoded or converted differently than the values in the blocks representing the spectral properties. For instance, the values within the block representing the red color band may be decoded to obtain a reflectance or intensity value for redness or red color attributes of a particular point, surface, or feature, whereas the values within block 305 from the same hyperspectral dataset may be decoded to obtain a distance, z-depth, or other positioning of the particular point, surface, or feature relative in a 3D space.

Hyperspectral encoder 100 may classify the points, surfaces, and/or features that were scanned from the scene based on the encoded hyperspectral datasets. Specifically, the spectral properties within the hyperspectral dataset may correspond to the spectral signature of the scanned point, surface, and/or feature. Hyperspectral encoder 100 may be configured with a database that maps the spectral signatures to different material properties, and hyperspectral encoder 100 may classify the material properties that are present within the scene based on the mapping of the spectral signatures to the different material properties. More specifically, neighboring points, surfaces, and/or features that have the same material property (e.g., plastic, metal, wood, etc.) may generate the same or similar returns when scanned over the same set of electromagnetic spectrum bands. For instance, hyperspectral encoder 100 may scan a set of points representing a particular metal, and may obtain similar reflectance, intensity, and/or other values (e.g., spectral properties) for those points across various microwave, visible light, infrared, ultraviolet, and/or other electromagnetic spectrum bands. Hyperspectral encoder 100 may then compare the spectral properties of the set of points to the spectral properties that have been mapped for different material properties, may determine that the spectral properties of the set of points match or are within a threshold of the spectral properties mapped for the particular metal, and may classify the set of points as being comprised of the particular metal based on the matching or similar spectral properties. In this manner, the hyperspectral datasets may contain the spectral signatures for the points, surfaces, and/or features within a scene, and hyperspectral encoder 100 may automatically classify those points, surfaces, and/or features as having different material properties based on the mapping of the spectral signatures to the different material properties.

Hyperspectral encoder 100 may process the single hyperspectral dataset for each scanned point, surface, and/or feature in order to generate a volumetric image, 3D model, 3D environment, point cloud, and/or other 3D representation of the scanned scene represented by the processed hyperspectral datasets. In particular, hyperspectral encoder 100 may process the spectral properties stored within a first set of bands from an array of the hyperspectral dataset in order to determine the visual characteristics or visual representation of a point, surface, or feature represented by that array, and may process the depth data stored within another band from the array of the hyperspectral dataset in order to determine the position of that point, surface, or feature having the decoded visual characteristic or visual representation within the volumetric image, 3D model, 3D environment, point cloud, and/or other 3D representation of the scanned scene.

Figure 4:
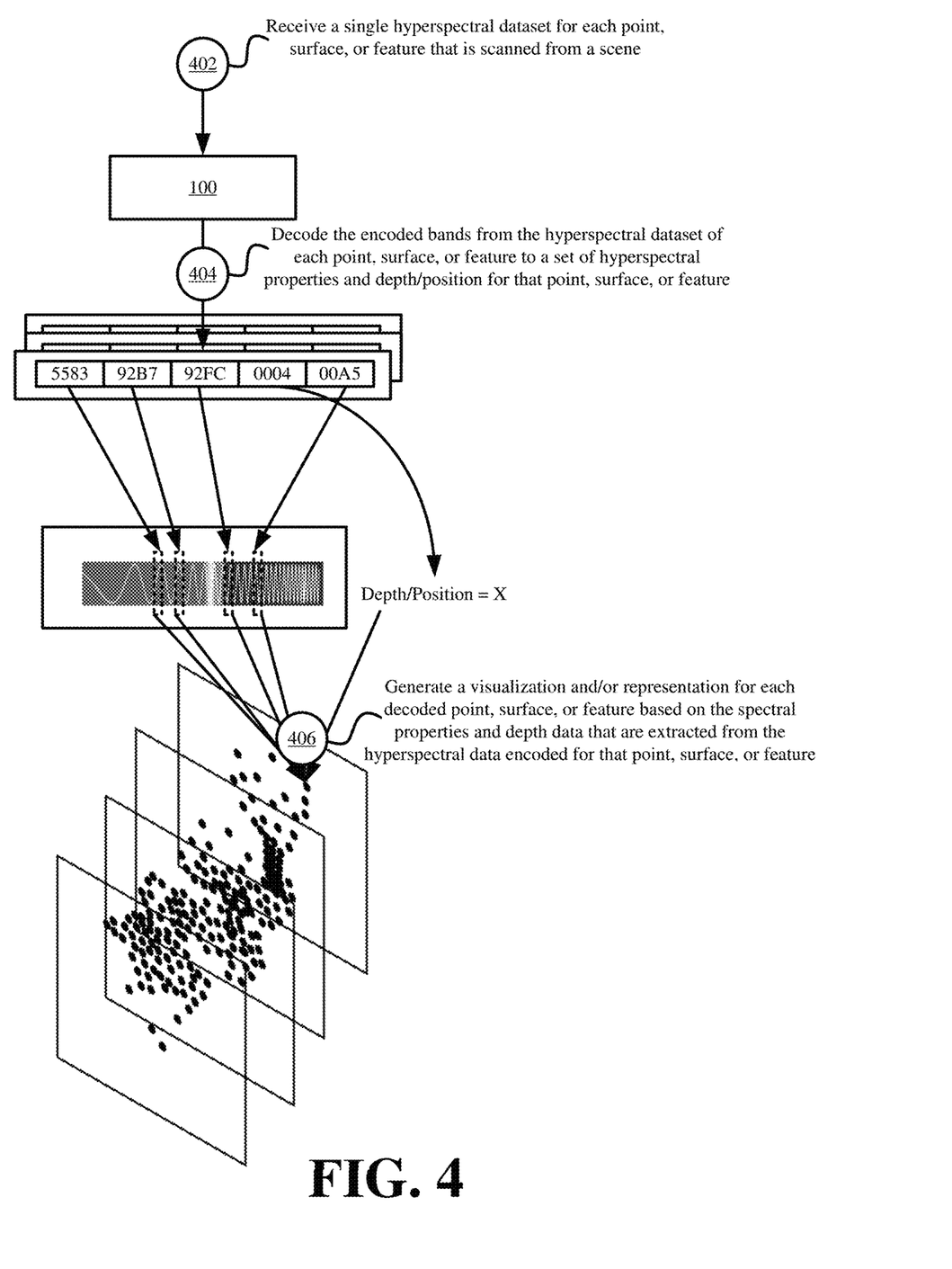
FIG. 4 presents an example of generating a volumetric image from the single hyperspectral dataset that is generated for each scanned point, surface, and/or feature of a scene in accordance with some embodiments presented herein.

FIG. 4 presents an example of generating a volumetric image from the single hyperspectral dataset that is generated for each scanned point, surface, and/or feature of a scene in accordance with some embodiments presented herein. Hyperspectral encoder 100 may receive (at 402) a single hyperspectral dataset for each point, surface, or feature that is scanned from a scene.

Hyperspectral encoder 100 may decode (at 404) the encoded bands from the hyperspectral dataset of each point, surface, or feature that is scanned from the scene. In some embodiments, one or more bands within the hyperspectral dataset may be tagged to indicate that the one or more bands are encoded with depth data as opposed to spectral properties. For instance, the one or more bands encoding the depth data may include a single bit that has a value of one, whereas the other bands of the hyperspectral dataset encoding the spectral properties may have the same single bit set to a value of zero. In some other embodiments, the one or more bands encoded with the depth data may be identified in the hyperspectral dataset metadata, or hyperspectral encoder 100 may be configured to encode and decode the depth data from same one or more bands. For instance, one or more fluorescent light bands may be reserved for the depth data because hyperspectral imaging sensor 101 and depth detector 103 may use frequencies within the one or more fluorescent light bands to measure and record depth, and because the one or more fluorescent light bands do not interfere with or otherwise impact spectral property measurements conducted over other electromagnetic spectrum bands within hyperspectral imaging sensor's 101 operating profile and/or operational capabilities. Accordingly, decoding (at 404) the hyperspectral dataset for a particular point may include extracting spectral properties recorded for the particular point from a first set of bands in the hyperspectral dataset that are encoded with the spectral properties, and extracting depth data for the particular point from one or more other bands in the hyperspectral dataset that are encoded with the depth data.

Hyperspectral encoder 100 may generate (at 406) a visualization and/or representation for each decoded point, surface, or feature based on the spectral properties and depth data that are extracted from the hyperspectral data encoded for that point, surface, or feature. Generating (at 406) the visualization for a particular point may include rendering a data point at a depth or position within a 3D space that corresponds to the depth or position at which the particular point was detected in the scanned scene, and presenting the data point with visual characteristics that are derived from the decoded spectral properties. For instance, the coloring of the data point may be based on the spectral properties that are decoded from one or more visible, infrared, ultraviolet, and/or other bands of the electromagnetic spectrum that were recorded for that data point. In some embodiments, the visual characteristics may be a direct color representation of the spectral properties when the spectral properties are from the RGB bands or visible light bands of the electromagnetic spectrum. In some other embodiments, the visual characteristics may be a derived representation of the spectral properties. The derived representation may use different visible colors and brightness to represent different non-visible spectral properties in the infrared, ultraviolet, and/or other non-visible light band of the electromagnetic spectrum. In some such embodiments, hyperspectral encoder 100 may provide a map or legend to associate the present visual characteristics to the non-visible spectral properties.

In some embodiments, generating (at 406) the visualization and/or representation may include constructing a point cloud with a set of data points that are distributed in 3D space to match the positioning and depth of points, surfaces, and/or features detected from scanning a scene. In some embodiments, generating (at 406) the visualization and/or representation may include rendering a 3D or volumetric image or model of the scene that accurately presents the spectral properties at exact positions of the points, surfaces, and/or features that are scanned from the scene. In some embodiments, generating (at 406) the visualization and/or representation may include presenting graphs, charts, and/or other data to represent the different spectral properties at the different positions or depths encoded within the hyperspectral dataset.

Figure 5:
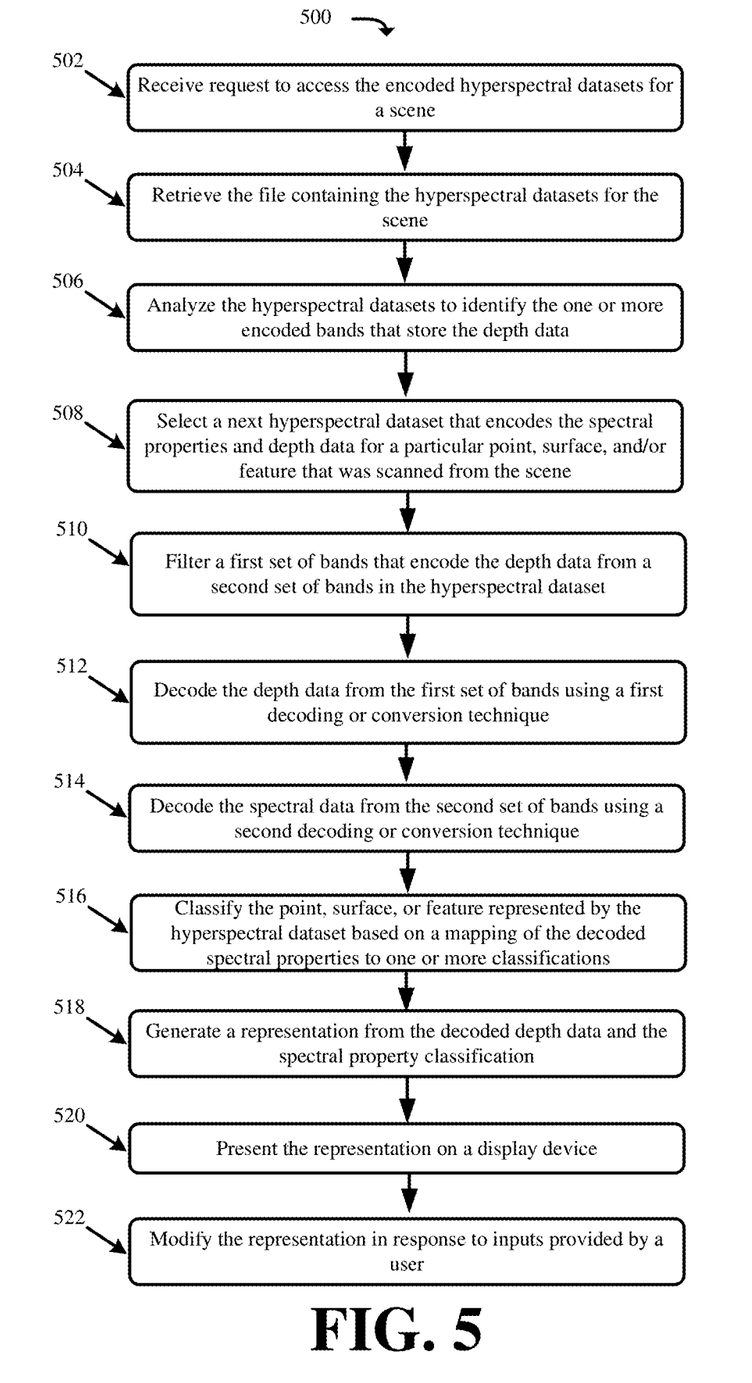
FIG. 5 presents a process for generating an accurate visualization of a scanned scene from decoding the single hyperspectral datasets in accordance with some embodiments presented herein.

FIG. 5 presents a process 500 for generating an accurate visualization of a scanned scene from decoding the single hyperspectral datasets in accordance with some embodiments presented herein. Process 500 may be implemented by hyperspectral encoder 100.

Process 500 may include receiving (at 502) a request to access an encoded scene. The request may include an identifier (e.g., filename, file path, Uniform Resource Locator ("URL"), etc.) for identifying the file that stores the encoded hyperspectral datasets for the scene. The request may be issued directly via an application or interface to hyperspectral encoder 100, or may be issued over a data network using a HyperText Transfer Protocol ("HTTP") or other network messaging protocol to hyperspectral encoder 100. The request may be issued to open, process, edit, render, and/or other interact with the encoded hyperspectral datasets.

Process 500 may include retrieving (at 504) the file containing the hyperspectral datasets for the scene. The file and/or hyperspectral datasets may be stored to a non-volatile storage medium or may be retrieved from memory or a remote storage device.

Process 500 may include analyzing (at 506) one or more of the hyperspectral datasets to identify the one or more encoded bands that store the depth data. In some embodiments, hyperspectral encoder 100 may analyze (at 506) the hyperspectral dataset metadata or the hyperspectral dataset to identify which encoded bands contain the depth data. For instance, the encoded bands containing the depth data may be tagged or otherwise differentiated from the encoded bands containing the spectral properties. In some embodiments, hyperspectral encoder 100 may default the encoding of the depth data to a specific set of bands (e.g., one or more bands within the fluorescent light spectrum), and the analysis (at 506) may involve identifying the specific set of bands within the hyperspectral dataset.

Process 500 may include selecting (at 508) a next hyperspectral dataset that encodes the spectral properties and depth data for a particular point, surface, and/or feature that was scanned from the scene and that has yet to be decoded. The retrieved file may store millions of hyperspectral datasets when the file is generated from a high-resolution scan of the scene or when the scene is large and contains lots of detail.

Process 500 may include filtering (at 510) a first set of bands that encode the depth data from a second set of bands in the hyperspectral dataset. The filtering (at 510) may prevent the depth data from being decoded and used as a spectral property, and the spectral properties from being decoded and used as depth data.

Process 500 may include decoding (at 512) the depth data from the first set of bands using a first decoding or conversion technique. The first decoding or conversion technique may convert the encoded data within the first set of encoded bands to a depth value and/or a positional value.

Process 500 may include decoding (at 514) the spectral data from the second set of bands using a second decoding or conversion technique. The second decoding or conversion technique may convert the encoded data within the second set of encoded bands to spectral properties including reflectance and/or intensity measurements detected across each of the second set of encoded bands. In some embodiments, the second decoding or conversion technique may convert the encoded data within the second set of encoded bands to color attributes or color values for visually representing the spectral properties across visible and non-visible light bands of the electromagnetic spectrum. In some embodiments, the first and second decoding or conversions techniques may be different. For instance, the first decoding or conversion technique may produce a coordinate position in 3D space from a particular encoded value in the second set of encoded bands, whereas the second decoding or conversion technique may produce a reflectance value for the same particular encoded value in the first set of encoded bands.

Process 500 may include classifying (at 516) the point, surface, or feature represented by the hyperspectral dataset based on a mapping of the decoded spectral properties to one or more material properties and/or other classifications. For instance, the spectral properties from each of the scanned electromagnetic spectrum bands may produce a unique spectral signature, and the unique spectral signature may map to a specific material property such as steel, iron, aluminum, various plastics, various woods (e.g., softwoods or hardwoods). More specifically, different combinations of values measured using frequencies of first and second infrared bands, a first microwave band, first, second, and third ultraviolet bands, and first, second, third, and fourth visible light bands may be produced by different plastics, metals, ceramics, woods, organic materials, etc., and hyperspectral encoder 100 may convert the decoded spectral properties and the resulting spectral signature to one or more such classifications.

Process 500 may include generating (at 518) a representation from the decoded depth data and the spectral property classification. Generating (at 518) the representation may include creating a point cloud data point in 3D space at a depth or position that matches the position or depth decoded from the first set of bands, and coloring or otherwise defining the visual characteristics of the data points based on the spectral properties that were decoded from the second set of bands. In some embodiments, the coloring or visual characteristics of the data points may be determined based on rules that are defined for different classifications. For instance, hyperspectral encoder 100 may color surfaces that are determined to have a "wood" classification with a first set of colors and may color surfaces that are determined to have a "plastic" classification with a second set of colors.

Process 500 may include presenting (at 520) the representation on a display device. In some embodiments, the representation may be a point cloud, 3D model, or 3D environment that is interactive. A user may select, move, or rotate the point cloud, 3D model, or 3D environment in order to visualize the spectral properties of the scanned scene.

Process 500 may include modifying (at 522) the representation in response to inputs provided by a user. The inputs may include edits for moving various points, surfaces, or features that are represented in the point cloud, 3D model, or 3D environment. The inputs may also include various effects that may be applied to change the coloring, lighting, and/or spectral properties of the points, surfaces, or features that are represented in the point cloud, 3D model, or 3D environment.

Figure 6:
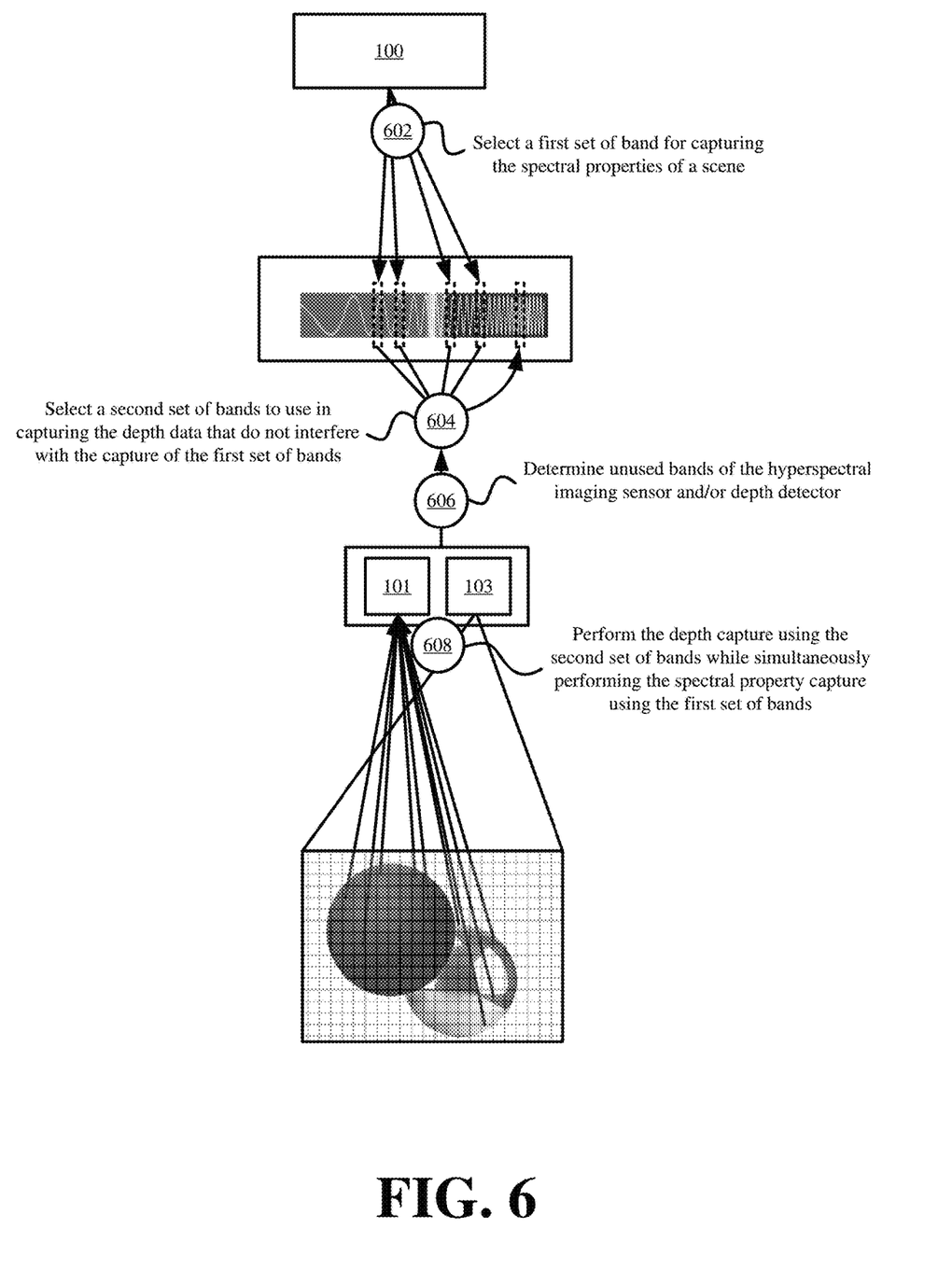
FIG. 6 illustrates an example of dynamically adjusting the encoding of the single hyperspectral dataset in accordance with some embodiments presented herein.

In some embodiments, hyperspectral encoder 100 may dynamically adjust the one or more bands that are used to capture the depth data based on the one or more bands that are selected for capturing the spectral properties of a scene. FIG. 6 illustrates an example of dynamically adjusting the encoding of the single hyperspectral dataset in accordance with some embodiments presented herein.

Hyperspectral encoder 100 may select (at 602) a first set of bands to use in capturing the spectral properties of a scene. The selection (at 602) may be based on user-provided input, or may be automatically determined from analyzing the scene. For instance, the user-provided input may specify different frequency ranges at which the user would like to analyze the spectral properties of the scene. Alternatively, hyperspectral encoder 100 may analyze the scene using one or more sensors to determine the lighting conditions and/or the reflectivity across different bands, and may select (at 602) the first set of bands to include bands that provide optimal returns based on the lighting conditions and/or that have the greatest measured returns (e.g., reflectivity, intensity, and/or other measurable values). In some embodiments, hyperspectral encoder 100 may be preconfigured to select (at 602) the first set of bands when hyperspectral imaging sensor 101 contains photosites and/or other sensors that operate over the electromagnetic spectrum frequencies associated with the first set of bands.

Hyperspectral encoder 100 may select (at 604) a second set of bands to use in capturing the depth data of the scene in response to the selection (at 602) of the first set of bands. Specifically, hyperspectral encoder 100 may select (at 604) the second set of bands to minimize or eliminate the impact that the frequencies from the second set of bands have on the first set of bands. For example, if the first set of bands includes low frequency radio waves and microwaves, hyperspectral encoder 100 may select high frequency infrared or ultraviolet waves to perform the depth capture. As another example, hyperspectral encoder 100 may be configured with a set of fluorescent light bands that are nondestructive to most other bands of the electromagnetic spectrum, and may select one or more of the fluorescent light bands for the depth capture when the first set of bands do not include any bands from the set of fluorescent light bands.

In some embodiments, selection (at 604) of the second set of bands may be dependent on the bands that hyperspectral imaging sensor 101 and/or depth detector 103 are capable of projecting, detecting, and/or measuring, and one or more of those bands that are not selected as part of the first set of bands for the spectral property capture. Accordingly, hyperspectral encoder 100 may base the selection (at 604) of the second set of bands on an analysis (at 606) of the bands supported by hyperspectral imaging sensor 101 that have not been selected for hyperspectral property capture. For instance, hyperspectral imaging sensor 101 may be include sensors that operate within the frequencies of the RGB visible light bands, first, second, third, and fourth infrared bands, and first, second, and third ultraviolet bands. If the RGB visible light bands, first, third, and fourth infrared bands, and first and second ultraviolet bands are selected for the spectral property capture, then hyperspectral encoder may select (at 604) the second infrared band and the third ultraviolet band for the depth capture, or may determine and select (at 604) whichever of the second infrared band and the third ultraviolet band is least destructive or least interferes with the bands selected for the spectral property capture.

Hyperspectral encoder 100 may perform (at 608) the depth capture using the second set of bands while simultaneously performing the spectral property capture using the first set of bands. Performing (at 608) the depth capture may include configuring depth detector 103 to project a structured light pattern or emit at the frequencies of the second set of bands, and using depth detector 103 or hyperspectral imaging sensor 101 to measure distortions to the structured light pattern, time-of-flight, return intensity, and/or other measures that may be converted to a distance or position.

Figure 7:
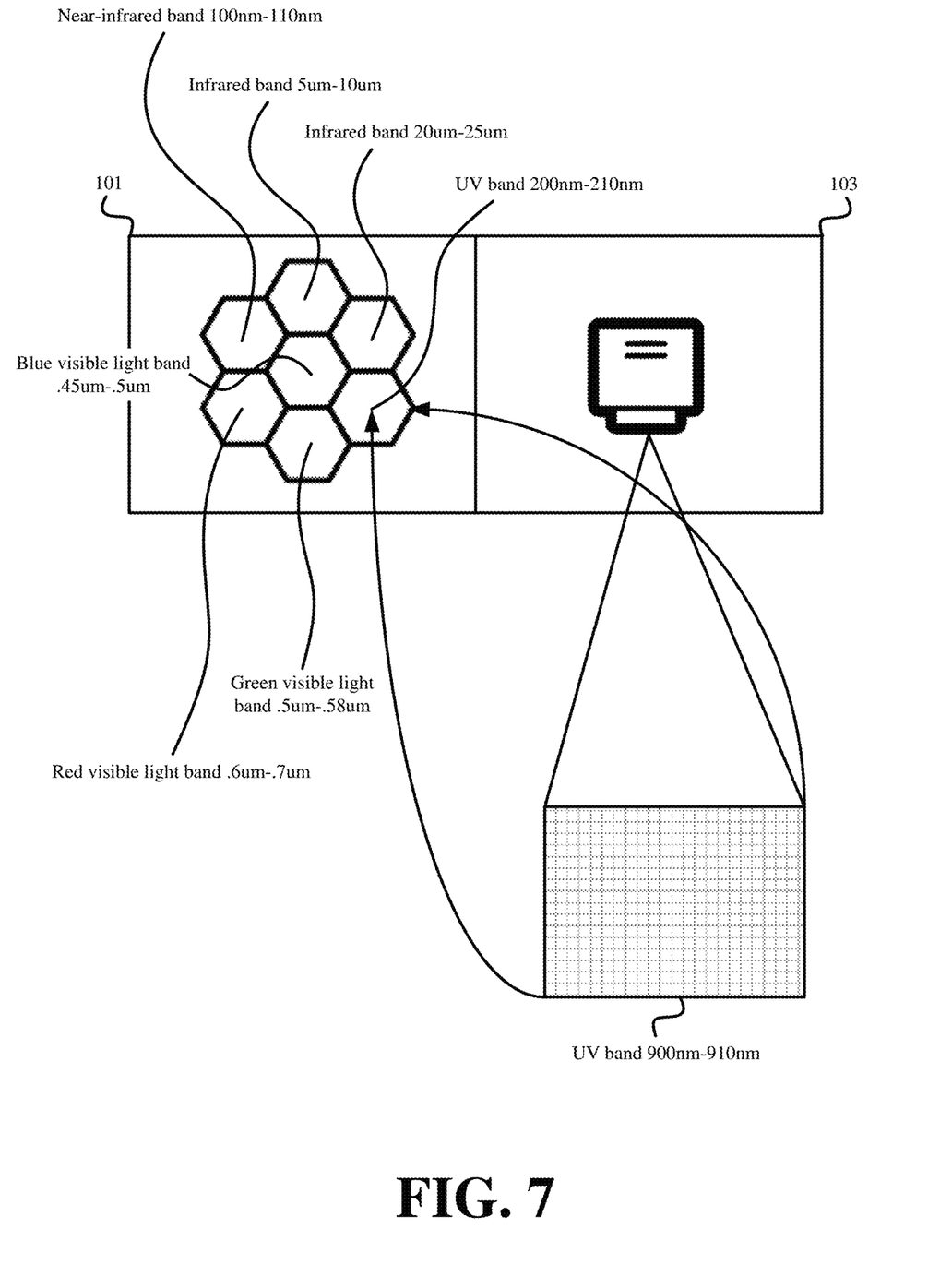
FIG. 7 illustrates an example device used to implement the hyperspectral encoder in accordance with some embodiments presented herein.

FIG. 7 illustrates an example device used to implement hyperspectral encoder 100 in accordance with some embodiments presented herein. As shown in FIG. 7, the device may include hyperspectral imaging sensor 101 and depth detector 103.

Hyperspectral imaging sensor 101 may include various photosites or sensors that operate over different bands or frequency ranges of the electromagnetic spectrum. As shown in FIG. 7, a first photosite may be adapted to receive and/or measure reflectance across a near-infrared band of frequencies between 100 and 110 nanometers, a second photosite may be adapted to receive and/or measure reflectance across the infrared band of frequencies between 5 and 10 micrometers, a third photosite may be adapted to receive and/or measure reflectance across the infrared band of frequencies between 20 and 25 micrometers, a fourth photosite may be adapted to receive and/or measure reflectance across the ultraviolet band of frequencies between 200 and 210 nanometers, a fifth photosite may be adapted to receive and/or measure reflectance across the red visible light band of frequencies between 0.6 and 0.7 micrometers, a sixth photosite may be adapted to receive and/or measure reflectance across the green visible light band of frequencies between 0.5 and 0.58 micrometers, and a seventh photosite may be adapted to receive and/or measure reflectance across the blue visible light band of frequencies between 0.45 and 0.5 micrometers. Hyperspectral imaging sensor 101 may include other photosites that may be adapted to receive and/or measure reflectance across other bands and/or frequency ranges of the electromagnetic spectrum.

Depth detector 103 may include a structured light pattern projector, a time-of-flight sensor, a configurable light emission source that may emit a signal at specified wavelengths and/or frequencies of the electromagnetic spectrum, and/or other sensor for determining depth. In some embodiments, depth detector 103 may be configured to operate over some of the same bands as hyperspectral imaging sensor 101. However, whereas hyperspectral imaging sensor 101 measures reflectance and/or intensity of different wavelengths of the electromagnetic spectrum, depth detector 103 may produce structured light patterns, generate pulses, and/or emit signals at the corresponding frequencies that may then be received and/or measured by hyperspectral imaging sensor 101 and subsequently converted into depth or distance measurements. For instance, depth detector 103 may generate a structured light pattern at the ultraviolet band of frequencies between 200 and 210 nanometers such that the fourth photosite of hyperspectral imaging sensor 101 may be used to detect distortions to the structured light pattern which hyperspectral encoder 100 may then convert to a depth or distance.

Hyperspectral encoder 100 may include a motor for rotating or moving hyperspectral imaging sensor 101 and depth detector 103 across an entire scene so that all point, surfaces, and/or features of the scene may be scanned. Hyperspectral encoder 100 may further include one or more hardware processors, memory, storage, and/or computing resources for encoding the spectral properties and depth data to the single hyperspectral dataset and/or for decoding the single hyperspectral dataset in order to generate 3D images, models, environments, and/or point clouds.

Figure 8:
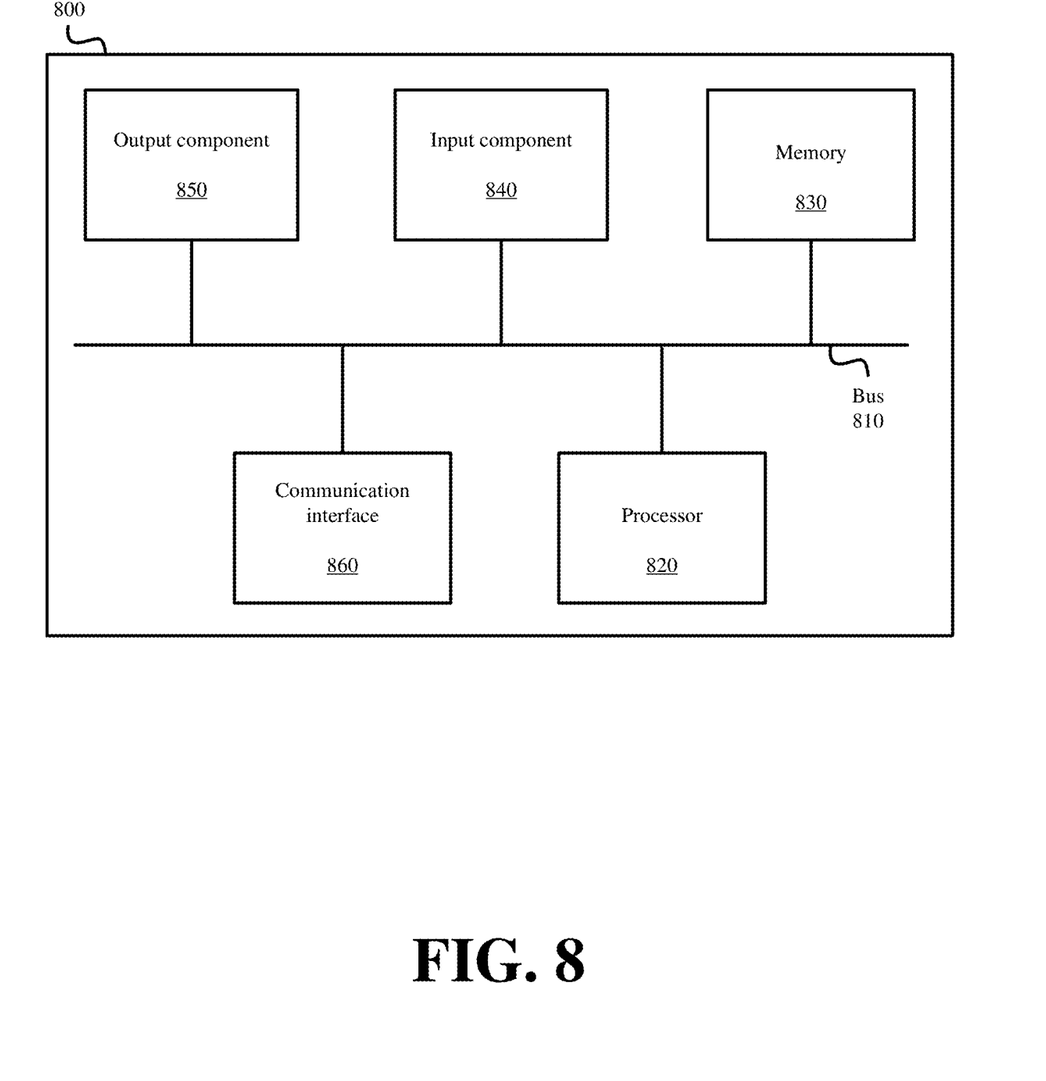
FIG. 8 illustrates example components of one or more devices, according to one or more embodiments described herein.

FIG. 8 is a diagram of example components of device 800. Device 800 may be used to implement one or more of the devices or systems described above (e.g., hyperspectral encoder 100, hyperspectral imaging sensor 101, depth detector 103, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining a plurality of electromagnetic spectrum bands available to scan a scene;
   selecting at least one electromagnetic spectrum band from the plurality of electromagnetic spectrum bands with which to measure a distance of a particular point in the scene, and a different set of electromagnetic spectrum bands from the plurality of electromagnetic spectrum bands with which to obtain spectral properties of the particular point, wherein said selecting comprises determining that the at least one electromagnetic spectrum band, when projected across the scene, does not distort or interfere with reflectance across the different set of electromagnetic spectrum bands;
   projecting a pattern or light using frequencies in the at least one electromagnetic spectrum band onto the particular point in the scene;
   performing a simultaneous capture of the distance and the spectral properties of the particular point in response to simultaneously:
   determining spectral properties of the particular point based on returns associated with the frequencies in the set of electromagnetic spectrum bands; and
   measuring the distance associated with the particular point based on measurements performed using the frequencies in the at least one electromagnetic spectrum band; and
   encoding the spectral properties and the distance of the particular point in a single hyperspectral dataset that is defined for the particular point, wherein the encoding directly associates the spectral properties that are determined for the particular point to a position of the particular point that is derived in part from the distance.

2. The method of claim 1 further comprising:
   determining distortion to the pattern at the particular point; and
   wherein measuring the distance comprises converting the distortion to a distance measurement.

3. The method of claim 1, wherein determining the spectral properties comprises:
   measuring one or more of a reflectance or intensity of the particular point at each band of the set of electromagnetic spectrum bands.

4. The method of claim 1 further comprising:
   determining a spectral signature of the particular point based on the spectral properties; and
   classifying the particular point with a particular classification based on the spectral signature of the particular point matching a spectral signature associated with the particular classification.

5. The method of claim 1 further comprising:
   comparing the spectral properties of the particular point to spectral properties that have been mapped for a plurality of material properties; and
   associating a particular material property to the particular point based on the spectral properties of the particular point matching or being within a threshold of the spectral properties that have been mapped to the particular material property.

6. The method of claim 1, wherein encoding the spectral properties and the distance comprises:
   generating a first set of blocks in the single hyperspectral dataset to represent the set of electromagnetic spectrum bands;
   defining each block of the first set of blocks with values corresponding to the returns associated with the frequencies in each band of the set of electromagnetic spectrum bands represented by that block;
   generating a second set of blocks in the single hyperspectral dataset to represent the at least one electromagnetic spectrum band; and
   defining at least one block of the second set of blocks with a value corresponding to the position.

7. The method of claim 6, wherein encoding the spectral properties and the distance further comprises:
   tagging the second set of blocks differently than the first set of blocks based on the second set of blocks encoding the position and the first set of blocks encoding the spectral properties.

8. The method of claim 1 further comprising:
generating a visualization by rendering a representation for the particular point in a three-dimensional ("3D") space at the position derived for the particular point and with visual characteristics defined from the spectral properties.

9. The method of claim 1 further comprising:
decoding the single hyperspectral dataset, wherein decoding comprising:
performing a first conversion of data stored in a first set of blocks of the single hyperspectral dataset; and
performing a second conversion of data stored in a second set of blocks of the single hyperspectral dataset, wherein performing the first conversion comprises converting the data stored in the first set of blocks to the spectral properties, and wherein performing the second conversion comprises converting the data stored in the second set of blocks to the position.

10. The method of claim 1, wherein measuring the distance comprises:
performing a time-of-flight or structured light pattern measurement using the frequencies in the at least one electromagnetic spectrum band while simultaneously measuring reflectance of the particular point across the set of electromagnetic spectrum bands.

11. The method of claim 1, wherein the at least one electromagnetic spectrum band comprises a fluorescent light band and the set of electromagnetic spectrum bands comprises two or more visible light bands, infrared bands, and ultraviolet bands.

12. The method of claim 1, wherein the plurality of electromagnetic spectrum bands comprises two or more microwave bands, visible light bands, infrared bands, ultraviolet bands, and fluorescent light bands.

13. The method of claim 1 further comprising:
capturing the spectral properties using a first set of sensors of an imaging device that are each adapted to receive the frequencies in a different one of the set of electromagnetic spectrum bands; and
allocating at least one other sensor of the imaging device that is adapted to receive the frequencies in the at least one electromagnetic spectrum band.

14. A hyperspectral encoder comprising:
an imaging device comprising one or more sensors that scan a particular point in a scene using frequencies in a plurality of electromagnetic spectrum bands; and
one or more hardware processors configured to:
determine the plurality of electromagnetic spectrum bands supported by the imaging device;
select at least one electromagnetic spectrum band from the plurality of electromagnetic spectrum bands with which to measure a distance of a particular point in the scene, and a different set of electromagnetic spectrum bands from the plurality of electromagnetic spectrum bands with which to obtain spectral properties of the particular point, wherein said selecting comprises determining that the at least one electromagnetic spectrum band, when projected across the scene, does not distort or interfere with reflectance across the different set of electromagnetic spectrum bands;
project a pattern or light using frequencies in the at least one electromagnetic spectrum band from the imaging device onto the particular point;
perform a simultaneous capture of the distance and the spectral properties of the particular point in response to simultaneously:
determining spectral properties of the particular point based on returns associated with the frequencies in the set of electromagnetic spectrum bands; and
measuring the distance associated with the particular point based on measurements performed using the frequencies in the at least one electromagnetic spectrum band; and
encode the spectral properties and the distance of the particular point in a single hyperspectral dataset that is defined for the particular point, wherein the encoding directly associates the spectral properties that are determined for the particular point to a position of the particular point that is derived in part from the distance.

15. The hyperspectral encoder of claim 14,
wherein the imaging device comprises a projector that projects the pattern using the frequencies in the at least one electromagnetic spectrum band; and
wherein the one or more hardware processors are further configured to:
determine distortion to the pattern at the particular point; and
convert the distortion to a distance measurement.

16. The hyperspectral encoder of claim 14, wherein determining the spectral properties comprises:
measuring one or more of a reflectance or intensity of the particular point at each band of the set of electromagnetic spectrum bands.

17. The hyperspectral encoder of claim 14, wherein the one or more hardware processors are further configured to:
determine a spectral signature of the particular point based on the spectral properties; and
classify the particular point with a particular classification based on the spectral signature of the particular point matching a spectral signature associated with the particular classification.

18. The hyperspectral encoder of claim 14, wherein the one or more hardware processors are further configured to:
compare the spectral properties of the particular point to spectral properties that have been mapped for a plurality of material properties; and
associate a particular material property to the particular point based on the spectral properties of the particular point matching or being within a threshold of the spectral properties that have been mapped to the particular material property.

19. The hyperspectral encoder of claim 14, wherein encoding the spectral properties and the distance comprises:
generating a first set of blocks in the single hyperspectral dataset to represent the set of electromagnetic spectrum bands;
defining each block of the first set of blocks with values corresponding to the returns associated with the frequencies in each band of the set of electromagnetic spectrum bands represented by that block;
generating a second set of blocks in the single hyperspectral dataset to represent the at least one electromagnetic spectrum band; and
defining at least one block of the second set of blocks with a value corresponding to the position.

20. A non-transitory computer-readable medium storing a plurality of processor-executable instructions that, when executed by one or more processors, cause a computing system to perform operations comprising:

determine a plurality of electromagnetic spectrum bands available to scan a scene;

select at least one electromagnetic spectrum band from the plurality of electromagnetic spectrum bands with which to measure a distance of a particular point in the scene, and a different set of electromagnetic spectrum bands from the plurality of electromagnetic spectrum bands with which to obtain spectral properties of the particular point, wherein said selecting comprises determining that the at least one electromagnetic spectrum band, when projected across the scene, does not distort or interfere with reflectance across the different set of electromagnetic spectrum bands;

project a pattern or light using frequencies in the at least one electromagnetic spectrum band onto the particular point in the scene;

perform a simultaneous capture of the distance and the spectral properties of the particular point in response to simultaneously:

determining determine spectral properties of the particular point based on returns associated with the frequencies in the set of electromagnetic spectrum bands; and measuring the distance associated with the particular point based on measurements performed using the frequencies in the at least one electromagnetic spectrum band; and encode the spectral properties and the distance of the particular point in a single hyperspectral dataset that is defined for the particular point, wherein the encoding directly associates the spectral properties that are determined for the particular point to a position of the particular point that is derived in part from the distance.

* * * * *